United States Patent
Sato

(10) Patent No.: US 11,752,628 B2
(45) Date of Patent: Sep. 12, 2023

(54) CONTROL METHOD FOR ROBOT, AND ROBOT SYSTEM

(71) Applicant: Seiko Epson Corporation, Toyko (JP)

(72) Inventor: Daisuke Sato, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 218 days.

(21) Appl. No.: 17/148,663

(22) Filed: Jan. 14, 2021

(65) Prior Publication Data
US 2021/0213610 A1 Jul. 15, 2021

(30) Foreign Application Priority Data
Jan. 15, 2020 (JP) ................................ 2020-004058

(51) Int. Cl.
*B25J 9/16* (2006.01)

(52) U.S. Cl.
CPC ... *B25J 9/1656* (2013.01); *G05B 2219/50391* (2013.01)

(58) Field of Classification Search
CPC ........ B25J 9/1656; B25J 9/1674; B25J 5/007; B25J 9/1602; G05B 2219/50391; G05B 19/0428; G05B 2219/40202; G05B 2219/45083
See application file for complete search history.

(56) References Cited

U.S. PATENT DOCUMENTS

| | | | | |
|---|---|---|---|---|
| 5,039,254 | A | * 8/1991 | Piercy | B25J 9/0087 |
| | | | | 405/188 |
| 9,278,451 | B2 * | 3/2016 | Kouno | G05B 19/4061 |
| 10,118,295 | B2 * | 11/2018 | Oumi | B25J 9/1674 |
| 2014/0277725 | A1 | 9/2014 | Kouno et al. | |
| 2017/0008171 | A1 | 1/2017 | Iwatake | |
| 2017/0144300 | A1 | 5/2017 | Oumi | |
| 2019/0138009 | A1* | 5/2019 | Saito | B25J 5/007 |
| 2019/0231460 | A1* | 8/2019 | DiMaio | B25J 9/1676 |

FOREIGN PATENT DOCUMENTS

| | | |
|---|---|---|
| CN | 104044137 A | 9/2014 |
| CN | 106737770 A | 5/2017 |
| JP | H1-119808 A | 1/1999 |
| JP | 2017-19039 A | 1/2017 |
| JP | 2019-87073 A | 6/2019 |

OTHER PUBLICATIONS

Search Report of the First Office Action CN Application No. 2021100482470 dated Apr. 20, 2023.

\* cited by examiner

*Primary Examiner* — Jonathan L Sample
*Assistant Examiner* — Elizabeth Rose Neleski
(74) *Attorney, Agent, or Firm* — Gang Yu

(57) ABSTRACT

A control method includes: (a) setting a first operation mode using a first deviation threshold as a threshold to detect a deviation error in an amount of control and a second operation mode using a second deviation threshold that is higher than the first deviation threshold; and (b) selecting one of the first operation mode and the second operation mode and executing an operation of a robot.

6 Claims, 6 Drawing Sheets

FIG. 5

```
                                              W1
┌─────────────────────────────────────────────┐
│ DEVIATION THRESHOLD SETTING                 │
│                                             │
│ FLOOR SURFACE SELECTION                     │
│                                             │
│   ⦿ BARE CONCRETE   ○ URETHANE-COATED [ENTER]│
│                                             │
│ AXIS  POSITION DEVIATION THRESHOLD   SPEED DEVIATION THRESHOLD │
│                                             │
│  J1    [      ] [↑][↓]      [      ] [↑][↓] │
│  J2    [      ] [↑][↓]      [      ] [↑][↓] │
│  J3    [      ] [↑][↓]      [      ] [↑][↓] │
│  J4    [      ] [↑][↓]      [      ] [↑][↓] │
│  J5    [      ] [↑][↓]      [      ] [↑][↓] │
│  J6    [      ] [↑][↓]      [      ] [↑][↓] │
│                                             │
│                              [BACK]  [SAVE] │
└─────────────────────────────────────────────┘
```

FIG. 6

| DEVIATION THRESHOLD SETTING | | | | | | | |
|---|---|---|---|---|---|---|---|
| FLOOR SURFACE SELECTION | | | | | | | |
| ⦿ BARE CONCRETE  ◯ URETHANE-COATED  ENTER | | | | | | | |
| AXIS | POSITION DEVIATION THRESHOLD | | | SPEED DEVIATION THRESHOLD | | | |
| J1 | 1.9 | ↑ | ↓ | 2.0 | ↑ | ↓ | |
| J2 | 2.0 | ↑ | ↓ | 2.1 | ↑ | ↓ | |
| J3 | 2.0 | ↑ | ↓ | 2.1 | ↑ | ↓ | |
| J4 | 2.3 | ↑ | ↓ | 2.4 | ↑ | ↓ | |
| J5 | 2.5 | ↑ | ↓ | 2.6 | ↑ | ↓ | |
| J6 | 2.5 | ↑ | ↓ | 2.6 | ↑ | ↓ | |
| | | | | | BACK | SAVE | |

W1

CONTROL METHOD FOR ROBOT, AND ROBOT SYSTEM

The present application is based on, and claims priority from JP Application Serial Number 2020-004058, filed Jan. 15, 2020, the disclosure of which is hereby incorporated by reference herein in its entirety.

BACKGROUND

1. Technical Field

The present disclosure relates to a control method for a robot, and a robot system.

2. Related Art

JP-A-1-119808 discloses a technique of setting a position deviation threshold and a speed deviation threshold and detecting a position deviation error and a speed deviation error in order to detect a malfunction or collision of a robot in servo motor control of the robot. When a deviation error is detected, the excitation state of the motor is turned off in response to this and therefore the robot makes an emergency stop.

However, the foregoing related-art technique has a problem in that, depending on the work by the robot, the set deviation threshold is not necessarily appropriate, resulting in the robot failing to make a desired emergency stop or making an unwanted emergency stop.

SUMMARY

According to a first aspect of the present disclosure, a control method for a robot is provided. The control method includes: (a) setting a first operation mode using a first deviation threshold as a threshold to detect a deviation error in an amount of control and a second operation mode using a second deviation threshold that is higher than the first deviation threshold as the threshold; and (b) selecting one of the first operation mode and the second operation mode and executing an operation of the robot.

According to a second aspect of the present disclosure, a robot system including: a mobile robot having a mobile pedestal and a manipulator installed at the mobile pedestal; and a control device controlling the mobile robot, is provided. The control device has: an operation mode storage unit storing a first operation mode using a first deviation threshold as a threshold to detect a deviation error in an amount of control and a second operation mode using a second deviation threshold that is higher than the first deviation threshold as the threshold; and an operation execution unit selecting one of the first operation mode and the second operation mode and executing an operation of the mobile robot.

BRIEF DESCRIPTION OF THE DRAWINGS

FIG. 5 is an explanatory view showing an example of a window for setting a deviation threshold.

FIG. 6 is an explanatory view showing the state where a candidate value for the deviation threshold is selected according to the selection of the type of floor surface.

DESCRIPTION OF EXEMPLARY EMBODIMENTS

Figure 1:
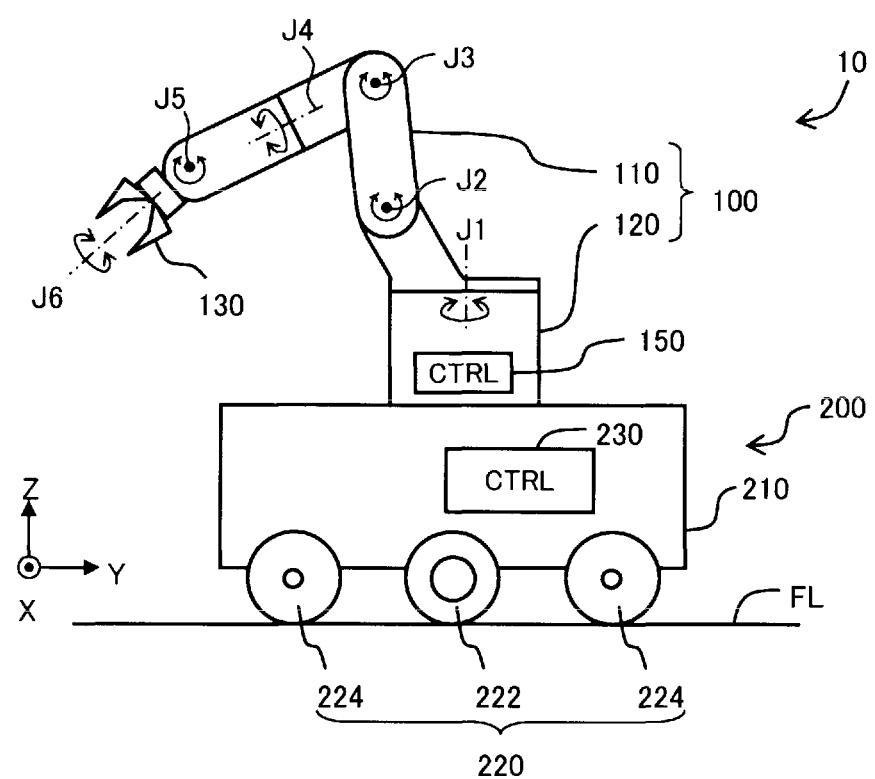
FIG. 1 is a conceptual view of a robot system.

FIG. 1 is a conceptual view of a robot system 10 according to an embodiment of the present disclosure. The robot system 10 is a mobile robot having a manipulator 100 and a mobile pedestal 200. In FIG. 1, three coordinate axes X, Y, Z in a robot coordinate system are shown. The origin in this robot coordinate system can be provided at any part of the robot system 10. However, in FIG. 1, the origin is drawn outside the robot system 10 for the sake of convenience of the illustration.

The manipulator 100 has an arm 110 and a base 120. An end effector 130 such as a hand is attached to a distal end part of the arm 110. The base 120 is fixed to the mobile pedestal 200. In the base 120, a control device 150 controlling the manipulator 100 is provided. In this example, the manipulator 100 is a 6-axis robot having six axes J1 to J6. The arm 110 is a link mechanism having a plurality of links that can pivot about the axes J1 to J6, respectively. However, a robot having at least one axis can be used as the manipulator 100. The manipulator 100 may be, for example, a vertical articulated robot or horizontal articulated robot such as a 6-axis robot.

The mobile pedestal 200 has a main body 210 and a wheel 220 provided at a lower part of the main body 210. The wheel 220 includes two drive wheels 222 and four idler wheels 224. In FIG. 1, half of these wheels is illustrated. In the main body 210, a control device 230 controlling the mobile pedestal 200 is provided. The mobile pedestal 200 is a mobile platform autonomously travelling on a floor surface FL. As the drive system of the mobile pedestal 200, an omnidirectional mobile system called mecanum may be used instead of a powered wheels steering system using the two drive wheels 222. Also, as the mobile pedestal 200, another device such as a linear slider may be used.

The control device 230 of the mobile pedestal 200 and the control device 150 of the manipulator 100 execute control of the robot system 10 while communicating with each other. That is, the two control devices 150, 230 can be considered to form a control device executing overall control of the robot system 10. In another embodiment, a single control device executing overall control of the robot system 10 may be used. The term "control device of the robot" has meanings including both of these configurations.

Figure 2:
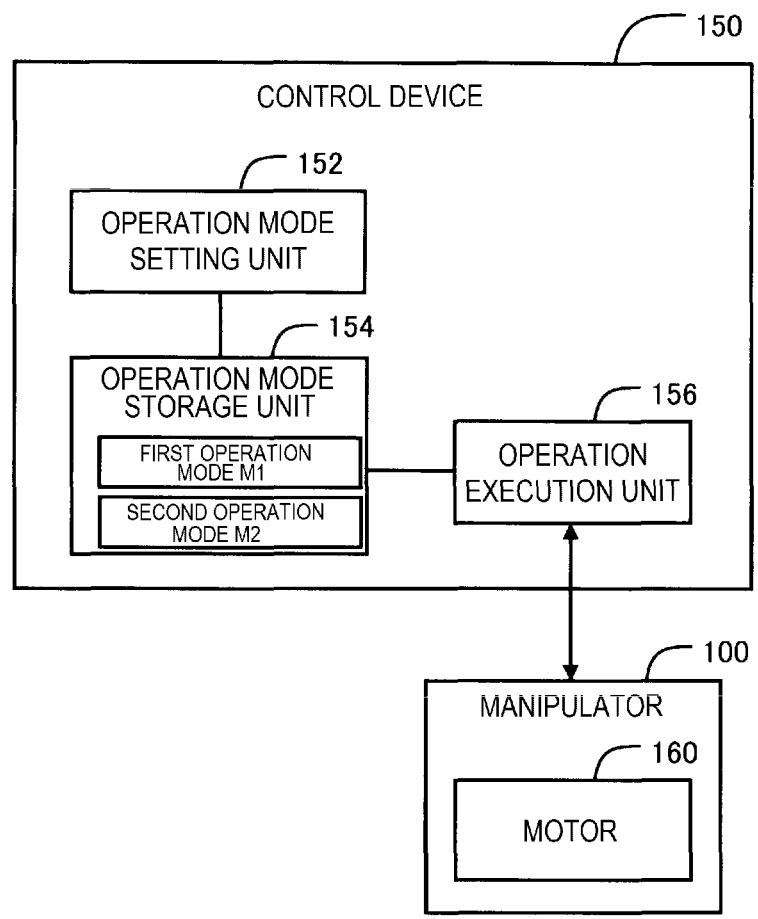
FIG. 2 is a block diagram showing functions of a control device of a manipulator.

FIG. 2 is a block diagram showing functions of the control device 150 of the manipulator 100. The control device 150 has an operation mode setting unit 152, an operation mode storage unit 154, and an operation execution unit 156. The operation mode setting unit 152 sets a plurality of operation modes including a first operation mode M1 and a second operation mode M2. The operation mode storage unit 154 stores parameters of the plurality of operation modes.

In this embodiment, the first operation mode M1 is a mode where the manipulator 100 operates in a state where the mobile pedestal 200 has stopped. Meanwhile, the second operation mode M2 is a mode where the mobile pedestal 200 moves in a state where the manipulator 100 does not change in attitude. The parameters of the operation modes M1, M2 include a deviation threshold, described later. The deviation threshold is a threshold to detect that the deviation in a specific amount of control such as position or speed of a motor 160 has become excessive. The operation execution unit 156 can select one operation mode from the plurality of operation modes stored in the operation mode storage unit 154 and execute control of the manipulator 100. The control of the manipulator 100 means the control of the motor 160 on each axis in the manipulator 100. As the first operation mode M1 and the second operation mode M2, other modes than the foregoing modes may be used.

In the second operation mode M2, where the mobile pedestal 200 moves, the manipulator 100 may be set in a servo-locked state. In the servo-locked state, the motor 160 of the manipulator 100 is maintained in an excited state but the position command value for each axis does not change. Therefore, the operation of the manipulator 100 practically stops and the attitude of the manipulator 100 is maintained without change. The purpose of setting the manipulator 100 in the servo-locked state is to reduce the operation time of the manipulator 100 before and after the movement of the mobile pedestal 200, or the like. That is, if the servo of the manipulator 100 is turned off every time the mobile pedestal 200 starts moving, and the servo of the manipulator 100 is turned on every time the mobile pedestal 200 stops moving, a switching time of approximately one second is needed. Also, repeating the turning on and off of the servo may cause the shortening of the life of components such as a relay. Meanwhile, when the mobile pedestal 200 travels with the manipulator 100 set in the servo-locked state when the floor surface has a large irregularity, the manipulator 100 may receive external vibration or impact and the deviation in the amount of control such as position and speed may become excessive, generating a deviation error. Consequently, the manipulator 100 may make an emergency stop. Thus, for the second operation mode M2, the deviation threshold of the amount of control is set to a higher value than for the first operation mode M1 and thus makes a deviation error less likely to occur during the movement of the mobile pedestal 200, as described later. Therefore, in the second operation mode M2, the probability of occurrence of the inconvenience that the manipulator 100 makes an unwanted emergency stop while the mobile pedestal 200 is travelling can be reduced. In the first operation mode M1, since a lower deviation threshold than in the second operation mode M2 is used, the probability of occurrence of the inconvenience that the manipulator 100 fails to make a desired emergency stop while the manipulator 100 is working can be reduced.

Figure 3:
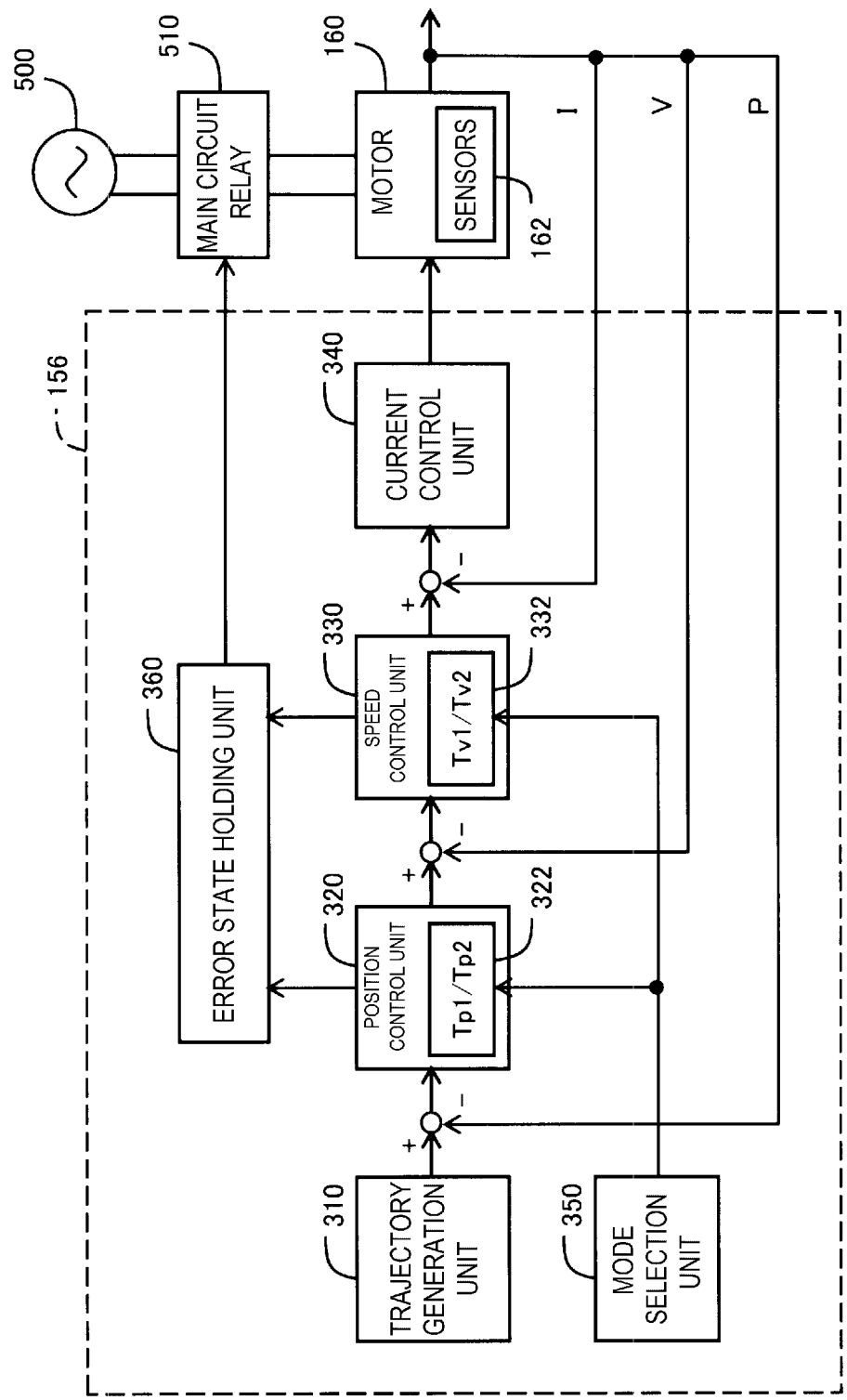
FIG. 3 is a block diagram showing a control function of an operation execution unit.

FIG. 3 is a block diagram showing the control function of the operation execution unit 156. The operation execution unit 156 has a trajectory generation unit 310, a position control unit 320, a speed control unit 330, a current control unit 340, a mode selection unit 350, and an error state holding unit 360. Also, a main power supply 500 and a main circuit relay 510 for supplying operating power to the motor 160 are illustrated in FIG. 3. The motor 160 is a servo motor and is provided with sensors 162 measuring position P, speed V, and current I as the amount of control.

The trajectory generation unit 310, the position control unit 320, the speed control unit 330, and the current control unit 340 are the parts executing servo control of the motor 160. Of these, the position control unit 320, the speed control unit 330, and the current control unit 340 are separately provided for each axis in the manipulator 100. However, FIG. 3 shows the control units for only one axis for the sake of convenience of the illustration. The trajectory generation unit 310 generates a position command value for each axis according to a control program of the manipulator 100. The "position of the axis" is also referred to as "displacement of the axis". The "position command value" is also referred to as "displacement command value". The position control unit 320 executes PID control or PD control according to the deviation between a position command value outputted from the trajectory generation unit 310 and a position measurement value P measured by the sensors 162. The speed control unit 330 executes PID control or PD control according to the deviation between a speed command value outputted from the position control unit 320 and a speed measurement value V measured by the sensors 162. The current control unit 340 executes PID control or PD control according to the deviation between a current command value outputted from the speed control unit 330 and a current measurement value I measured by the sensors 162. A control signal, which is an output from the current control unit 340, is supplied to a drive circuit of the motor 160.

The position control unit 320 includes a comparison unit 322 comparing a position deviation with a position deviation threshold. When the position deviation exceeds the position deviation threshold, the comparison unit 322 issues a deviation error and notifies the error state holding unit 360 of the deviation error. As the position deviation threshold, one of a first position deviation threshold Tp1 for the first operation mode M1 and a second position deviation threshold Tp2 for the second operation mode M2 can be used. As described above, in order to make a deviation error less likely to occur during the movement of the mobile pedestal 200 in the second operation mode M2, the second position deviation threshold Tp2 is set to a higher value than the first position deviation threshold Tp1. Also, a value for another operation mode may be able to be selected as the position deviation threshold. The position deviation threshold used at the comparison unit 322 is selected from a plurality of position deviation thresholds according to a mode selection command provided from the mode selection unit 350. The position deviation is the difference between a command value about the position outputted from the trajectory generation unit 310 and inputted to the position control unit 320 and a value about the position of the motor 160 after the motor 160 actually operates based on the command value about the position or the like.

The speed control unit 330, too, includes a comparison unit 332 comparing a speed deviation with a speed deviation threshold. When the speed deviation exceeds the speed deviation threshold, the comparison unit 332 issues a deviation error and notifies the error state holding unit 360 of the deviation error. As the speed deviation threshold, one of a first speed deviation threshold Tv1 for the first operation mode M1 and a second speed deviation threshold Tv2 for the second operation mode M2 can be used. The second speed deviation threshold Tv2 is set to a higher value than the first speed deviation threshold Tv1. Also, a value for another operation mode may be able to be selected as the speed deviation threshold. The speed deviation threshold used at the comparison unit 332 is selected from a plurality of speed deviation thresholds according to a mode selection command provided from the mode selection unit 350. The speed deviation is the difference between a command value about the speed outputted from the trajectory generation unit 310 and inputted to the speed control unit 330 via the position control unit 320 and a value about the speed of the motor 160 after the motor 160 actually operates.

When a deviation error occurs at least at one of the position control unit 320 and the speed control unit 330, the deviation error is held by the error state holding unit 360. The error state holding unit 360 supplies an emergency stop signal corresponding to the occurrence of the deviation error to several circuits including the main circuit relay 510. On receiving the emergency stop signal, the main circuit relay 510 switches from on-state to off-state. The manipulator 100 makes an emergency stop in response to this. Thus, the operation of the manipulator 100 can be immediately stopped when a deviation error occurs. Once a deviation error occurs, the deviation error is held by the error state holding unit 360. Therefore, the emergency stop state is maintained until the worker cancels the error.

The configuration to make the deviation threshold switchable at the comparison units 322, 332 may be employed at least at one axis of the plurality of axes J1 to J6 in the manipulator 100. However, employing this configuration at all of the plurality of axes J1 to J6 in the manipulator 100 enables more appropriate execution of an emergency stop due to a deviation error in each operation mode.

In this embodiment, the "specific amount of control" for which different deviation thresholds corresponding to a plurality of operation modes are set is both position and speed. However, one of position and speed may be employed. In other words, different deviation thresholds corresponding to a plurality of operation modes may be set for at least one of position and speed. Thus, the probability of occurrence of the inconvenience that the manipulator 100 fails to make a desired emergency stop or makes an unwanted emergency stop can be reduced. Also, setting different deviation thresholds corresponding to a plurality of operation modes for both position and speed can further reduce the probability of occurrence of the inconvenience. A comparison unit for detecting a deviation error may also be provided in the current control unit 340 and different deviation thresholds corresponding to a plurality of operation modes may be set there.

Figure 4:
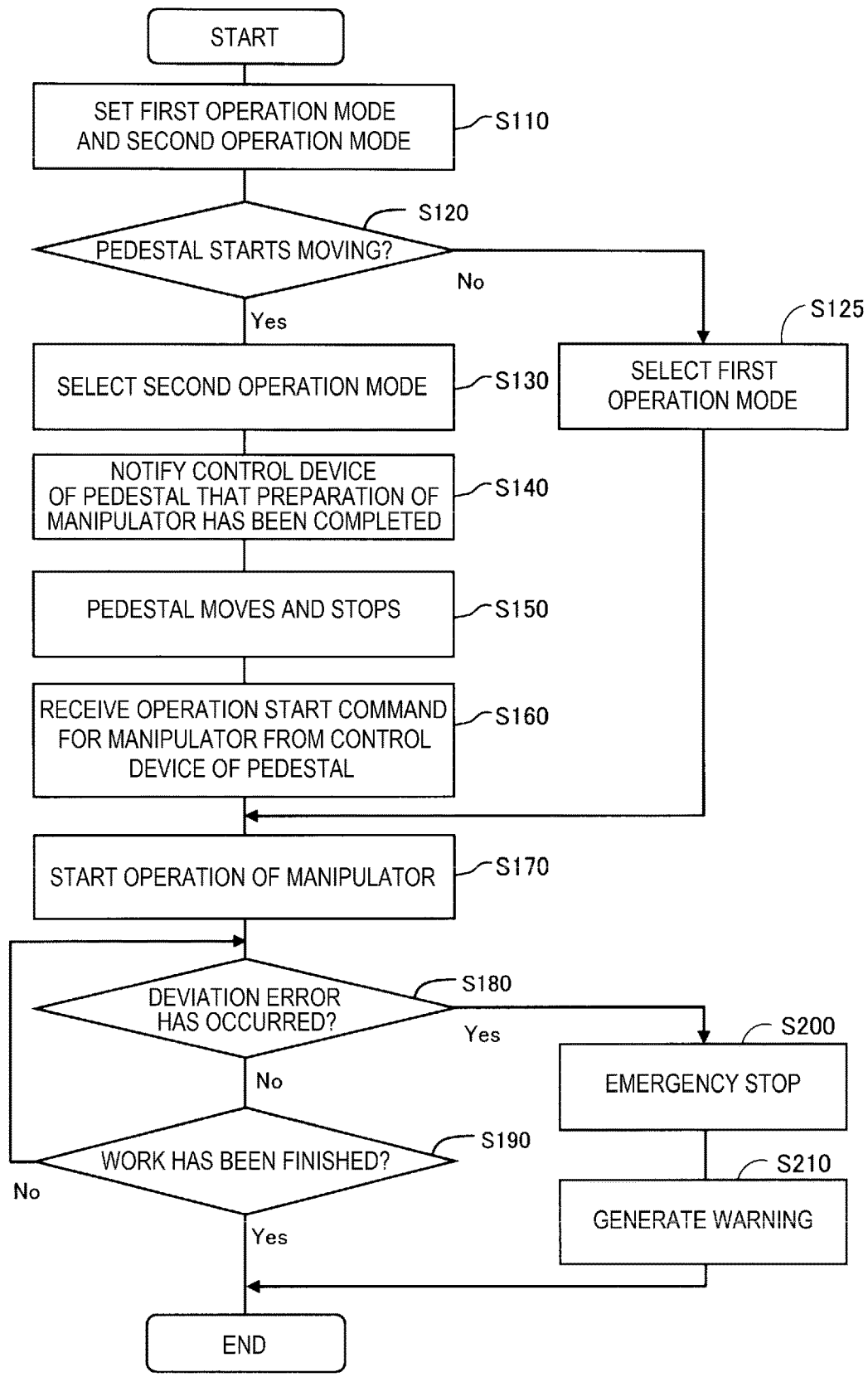
FIG. 4 is a flowchart showing an operation of the manipulator.

FIG. 4 is a flowchart showing operations of the manipulator 100. The processing in FIG. 4 is executed mainly by the control device 150 of the manipulator 100. In step S110, the operation mode setting unit 152 sets a plurality of operation modes including the first operation mode M1 and the second operation mode M2 according to an instruction by the worker. Parameters of the set operation modes M1, M2 are stored in the operation mode storage unit 154. The setting of the operation modes in step S110 is executed in preparation work before work using the robot system 10 is started.

FIG. 5 is an explanatory view showing an example of a window W1 for setting a deviation threshold as a parameter of the second operation mode M2. This window W1 is a dialog box displayed at a display unit, not illustrated, of the control device 150 of the manipulator 100. Also, the display of the window W1 and the setting of the parameters may be carried out using another computer such as a teach pendant, instead of the control device 150 of the manipulator 100.

The window W1 includes a plurality of options about types of floor surface and a setting field for the position deviation threshold and the speed deviation threshold for each of the plurality of axes J1 to J6 in the manipulator 100. In this example, "bare concrete" and "urethane-coated" are shown as the plurality of options about types of floor surface. However, any other options can be used. In FIG. 5, "bare concrete" is selected as the type of floor surface. A press on an "enter" button in a floor surface selection section in this state causes the operation mode setting unit 152 to accept the selection of the floor surface. In response to this, candidate values for the position deviation threshold and the speed deviation threshold for each of the plurality of axes J1 to J6 are selected and displayed. Candidate values corresponding to the respective types of floor surface are stored in advance in the operation mode setting unit 152 or the operation mode storage unit 154.

FIG. 6 is an explanatory view showing a state where deviation thresholds are selected according to the selection of the type of floor surface. In this example, candidate values for the position deviation threshold and the speed deviation threshold for each of the plurality of axes J1 to J6 are selected and displayed. The worker can arbitrarily adjust any of the candidate values for the deviation thresholds for each axis. The same candidate value for the position deviation threshold and the same candidate value for the speed deviation threshold may be selected and displayed for all of the plurality of axes J1 to J6. A press on a "save" button by the worker causes the adjusted deviation threshold to be stored in the operation mode storage unit 154 as a parameter of the second operation mode M2.

The setting of parameters of the first operation mode M1 can be executed as in the second operation mode M2. However, since the mobile pedestal 200 is stopped in the first operation mode M1, the parameters of the first operation mode M1 are set regardless of the type of floor surface. The candidate values for the deviation thresholds for the first operation mode M1 are smaller than the candidate values for the deviation thresholds for the second operation mode M2.

In the examples shown in FIGS. 5 and 6, candidate values for the deviation thresholds are selected according to the selection of the type of floor surface. However, candidate values for the deviation thresholds may be selected according to the selection or setting of other environmental conditions than the type of floor surface. The other environmental conditions may be, for example, the weight of a workpiece held by the end effector 130. In another embodiment, candidate values for the deviation thresholds may be presented without selecting or setting environmental conditions such as the type of floor surface. In this case, the section for selecting or setting environmental conditions such as the type of floor surface can be omitted from the window W1. However, in a configuration where candidate values for the deviation thresholds are selected according to environmental conditions including the type of floor surface when these environmental conditions are selected or set by the worker, appropriate deviation thresholds corresponding to various environmental conditions can be easily set.

In step S120 in FIG. 4, the operation execution unit 156 determines whether the mobile pedestal 200 starts moving or not. When the operation execution unit 156 has not received a command to prepare for the start of travelling from the control device 230 of the mobile pedestal 200, the operation execution unit 156 determines in step S120 that the mobile pedestal 200 does not start moving, and proceeds to step S125. In step S125, the operation execution unit 156 selects the first operation mode M1 and proceeds to step S170, described later. Meanwhile, when the operation execution unit 156 has received a command to prepare for the start of travelling from the control device 230 of the mobile pedestal 200, the operation execution unit 156 determines in step S120 that the mobile pedestal 200 starts moving, and proceeds to step S130, described later. Also, a program command to switch between the operation modes may be described in the control program for the manipulator 100, instead of switching the selection between the first operation mode M1 and the second operation mode M2 according to the presence/absence of a command from the control device 230 of the mobile pedestal 200.

In step S130, the operation execution unit 156 selects the second operation mode M2. Thus, the deviation thresholds Tp2, Tv2 for the second operation mode M2 are set at the position control unit 320 and the speed control unit 330 shown in FIG. 3. As described above, the second operation mode M2 is a mode where the mobile pedestal 200 travels. In this mode, the manipulator 100 is set in the servo-locked state and therefore the attitude of the manipulator 100 is maintained without change.

In step S140, the operation execution unit 156 notifies the control device 230 of the mobile pedestal 200 that the preparation of the manipulator 100 has been completed. In step S150, the movement and stop of the mobile pedestal 200 is executed. That is, the mobile pedestal 200 travels to and stops at the place where the manipulator 100 performs the next work. In step S160, the operation execution unit 156 receives an operation start command for the manipulator 100 from the control device 230 of the mobile pedestal 200. In response to this, the operation mode of the manipulator 100 is switched from the second operation mode M2 to the first operation mode M1. In step S170, the operation execution unit 156 starts the operation of the manipulator 100.

Steps S180 to S210 are the processing during the operation of the manipulator 100. In step S180, the operation execution unit 156 determines whether a deviation error has occurred or not. This determination is whether a deviation error is held by the error state holding unit 360 or not. When a deviation error has not occurred, the operation execution unit 156 proceeds to step S190 and determines whether the work by the manipulator 100 has been finished or not. When the work has not been finished, the operation execution unit 156 returns to step S180 and repeats steps S180 and S190 until the work is finished. Meanwhile, when a deviation error has occurred, the operation execution unit 156 proceeds from step S180 to step S200 and executes an emergency stop of the manipulator 100. This emergency stop is carried out by switching the main circuit relay 510 shown in FIG. 3 from on-state to off-state and thus shutting down the power supply of the motor 160. In the emergency stop, a regenerative brake or a mechanical brake may be operated as well. In step S210, the operation execution unit 156 generates a warning to the worker, using a notification unit, not illustrated, such as a display unit or a speaker.

As described above, the deviation threshold used in the second operation mode M2 is set to a higher value than the deviation threshold used in the first operation mode M1. Therefore, even when a significantly large deviation occurs in the amount of control of the manipulator 100 due to an irregularity on the floor surface during the travelling of the mobile pedestal 200 in the second operation mode M2, the probability of immediate occurrence of a deviation error is lowered. Thus, the probability of occurrence of the inconvenience that the manipulator 100 makes an unwanted emergency stop during the travelling of the mobile pedestal 200 can be reduced.

In this embodiment, the two operation modes M1, M2 are set as the operation mode of the robot system 10. However, other operation modes may also be set. For example, a "human-robot symbiosis mode" where the robot system 10 and a human work at positions that close to each other may be set as an operation mode option. For the human-robot symbiosis mode, the deviation threshold of a specific amount of control of the manipulator 100 may be set to a lower value than the deviation threshold for the first operation mode M1, so that the manipulator 100 can make an emergency stop with a smaller deviation. In this case, the human-robot symbiosis mode may be set as the "first operation mode", and the foregoing first operation mode M1 may be set as the "second operation mode". When the human-robot symbiosis mode is set as an operation mode option, for example, a proximity sensor may be provided in the robot system 10, and the robot system 10 may shift to the human-robot symbiosis mode when the proximity sensor has detected a human's approach.

In another embodiment, an "abutment mode" where so-called "abutment work" is carried out may be set as an operation mode option. The abutment work is the work of moving a workpiece held by the manipulator 100 toward another object and stopping the manipulator 100 when the workpiece comes into contact with the object. In the abutment mode, a force sensor is provided at a distal end part of the manipulator 100, and force control to detect a small external force applied when the workpiece held by the manipulator 100 comes into contact with the surface of another object, and then stop the operation of the manipulator 100, is executed. In the abutment mode, the specific amount of control in which a deviation error is to be detected is the force detected by the force sensor. For the abutment mode, the deviation threshold of the force may set to be lower than for another operation mode using force control, so that an excessive force is not applied to the workpiece or another object. In this case, the abutment mode may be set as the "first operation mode", and another operation mode using force control may be set as the "second operation mode".

As described above, in the above embodiment, the first operation mode using the first deviation threshold as a threshold to detect a deviation error in the amount of control of the manipulator 100, and the second operation mode using the second deviation threshold, which is higher than the first deviation threshold, are set. One of the operation modes is selected and the operation of the manipulator 100 is executed. Thus, the manipulator 100 can be made to operate in an appropriate mode corresponding to the content of the work by the robot system 10. Therefore, the probability of occurrence of the inconvenience that the manipulator 100 fails to make a desired emergency stop or makes an unwanted emergency stop can be reduced.

OTHER EMBODIMENTS

The present disclosure is not limited to the above embodiment and can be implemented in various aspects without departing from the spirit and scope of the present disclosure. For example, the present disclosure can be implemented in the aspects described below. A technical feature in the embodiments corresponding to a technical feature in each of the aspects described below can be suitably replaced or combined in order to solve a part or all of the problems of the present disclosure or in order to achieve a part or all of the effects of the present disclosure. Also, the technical feature can be suitably deleted unless described as essential in this specification.

(1) According to a first aspect of the present disclosure, a control method for a robot is provided. The control method includes: (a) setting a first operation mode using a first deviation threshold as a threshold to detect a deviation error in an amount of control and a second operation mode using a second deviation threshold that is higher than the first deviation threshold as the threshold; and (b) selecting one of the first operation mode and the second operation mode and executing an operation of the robot.

This control method enables the robot to operate in an appropriate mode corresponding to the content of the work by the robot and therefore can reduce the probability of occurrence of the inconvenience that the robot fails to make a desired emergency stop or makes an unwanted emergency stop.

(2) In the control method, the robot may have an arm pivoting about an axis. The amount of control may include position or speed of the axis.

This control method sets a deviation threshold of the position or speed of the axis of the robot and therefore can reduce the probability of occurrence of the inconvenience that the robot fails to make a desired emergency stop or makes an unwanted emergency stop.

(3) In the control method, the amount of control may include both position and speed of the axis.

This control method sets a deviation threshold of both the position and speed of the axis of the robot and therefore can further reduce the probability of occurrence of the inconvenience that the robot fails to make a desired emergency stop or makes an unwanted emergency stop.

(4) In the control method, the robot may have a plurality of axes. The first deviation threshold and the second deviation threshold may be set for each of the plurality of axes.

This control method sets a deviation threshold for the plurality of axes of the robot and therefore can further reduce the probability of occurrence of the inconvenience that the robot fails to make a desired emergency stop or makes an unwanted emergency stop.

(5) In the control method, the robot may be a mobile robot having a mobile pedestal and a manipulator installed at the mobile pedestal. The first operation mode may be a mode where the manipulator operates in a state where the mobile pedestal is stopped. The second operation mode may be a mode where the mobile pedestal moves in a state where the manipulator does not change in attitude.

In this control method, a higher deviation threshold is used in the second operation mode, where the mobile pedestal moves. Therefore, even when a slight deviation occurs in the amount of control of the manipulator during the movement of the mobile pedestal, the manipulator does not make an emergency stop and the mobile pedestal can continue moving.

(6) In the control method, the second operation mode may be a mode where the mobile pedestal moves in a state where a motor on each axis in the manipulator is servo-locked.

In this control method, a higher deviation threshold is used in the second operation mode, where the mobile pedestal moves. Therefore, even when a slight deviation occurs in the amount of control of the manipulator during the movement of the mobile pedestal, the manipulator does not make an emergency stop and the mobile pedestal can continue moving.

(7) In the control method, the mobile pedestal may be a mobile platform travelling on a floor surface. The (a) may include accepting an environment condition including a type of the floor surface, and selecting a candidate value for the second deviation threshold according to the environmental condition.

This control method enables selection of an appropriate candidate value for the second deviation threshold according to the floor surface where the mobile pedestal travels.

(8) According to a second aspect of the present disclosure, a robot system including: a mobile robot having a mobile pedestal and a manipulator installed at the mobile pedestal; and a control device controlling the mobile robot, is provided. The control device has: an operation mode storage unit storing a first operation mode using a first deviation threshold as a threshold to detect a deviation error in an amount of control and a second operation mode using a second deviation threshold that is higher than the first deviation threshold as the threshold; and an operation execution unit selecting one of the first operation mode and the second operation mode and executing an operation of the mobile robot.

This robot system enables the mobile robot to operate in an appropriate mode corresponding to the content of the work by the mobile robot and therefore can reduce the probability of occurrence of the inconvenience that the robot fails to make a desired emergency stop or makes an unwanted emergency stop.

What is claimed is:

1. A control method for a robot, the control method comprising:
   (a) setting a first operation mode using a first deviation threshold as a threshold to detect a deviation error in an amount of control and a second operation mode using a second deviation threshold that is higher than the first deviation threshold as the threshold; and
   (b) selecting one of the first operation mode and the second operation mode and executing an operation of the robot,
   wherein
   the robot is a mobile robot having a mobile pedestal and a manipulator installed at the mobile pedestal,
   the first operation mode is a mode where the manipulator operates in a state where the mobile pedestal is stopped, and
   the second operation mode is a mode where the mobile pedestal moves in a state where the manipulator does not change in attitude,
   the second operation mode is a mode where the mobile pedestal moves in a state where a motor on each axis in the manipulator is servo-locked, in the servo-locked, state, the motor of the manipulator is maintained in an excited state but position command value for each axis does not change.

2. The control method according to claim 1, wherein the robot has an arm pivoting about an axis, and the amount of control includes position or speed of the axis.

3. The control method according to claim 2, wherein the amount of control includes both position and speed of the axis.

4. The control method according to claim 1, wherein the robot has a plurality of axes, and the first deviation threshold and the second deviation threshold are set for each of the plurality of axes.

5. The control method according to claim 1, wherein the mobile pedestal is a mobile platform travelling on a floor surface, and
   the (a) includes:
   accepting an environment condition including a type of the floor surface; and
   selecting a candidate value for the second deviation threshold according to the environmental condition.

6. A robot system comprising:
   a mobile robot having a mobile pedestal and a manipulator installed at the mobile pedestal; and
   a control device controlling the mobile robot, wherein
   the control device has:
   an operation mode storage unit storing, a first operation mode using a first deviation threshold as a threshold to detect a deviation error in an amount of control and a second operation mode using a second deviation threshold that is higher than the first deviation threshold as the threshold; and an operation execution unit selecting one of the first operation anode and the second operation mode and executing an operation of the mobile robot,
wherein
the first operation mode is a mode where the manipulator operates in a state where the mobile pedestal is stopped, and
the second operation mode is a mode where the mobile pedestal moves in a state where the manipulator does not change in attitude,
the second operation mode is a mode where the mobile pedestal moves in a state where a motor on each axis in the manipulator is servo-locked, in the servo-locked state, the motor of the manipulator is maintained in an excited state but position command value for each axis does not change.

* * * * *